May 16, 1967 P. BAUER 3,319,659

FLUID PULSE ATTENUATOR

Filed Dec. 31, 1964

INVENTOR.
PETER BAUER

BY Griffin and Stokes
ATTORNEYS

United States Patent Office 3,319,659

Patented May 16, 1967

3,319,659

FLUID PULSE ATTENUATOR

Peter Bauer, Germantown, Md., assignor to Sperry Rand Corporation, New York, N.Y., a corporation of Delaware Filed Dec. 31, 1964, Ser. No. 422,710
19 Claims. (Cl. 138—41)

This invention relates to structure for attenuating a fluid pulse signal with a minimum of pulse propagation delay, and more particularly, discloses means employing a sponge medium of predetermined characteristics which is inserted into the confines of the interior of a fluid channel so as to completely obstruct the flow area but without stopping fluid flow.

The rapidly developing field of pure fluid amplifier techniques has found particular application in computer and data processing logic circuits wherein information is transmitted by a fluid medium rather than by an electric voltage or current. In one basic pure fluid amplifier of the prior art, a fluid power jet stream of relatively large energy is deflected into one of several output channels by means of a small energy control stream which impinges thereon at about a right angle. Quite often, the power stream in a selected output channel of a fluid amplifier is required to be utilized as a control stream to another fluid amplifier. In this case it may be necessary to attenuate the power stream energy before it is applied to the control input of said further amplifier. However, said attenuation should be accomplished with little or no propagation delay of the power stream fluid, inasmuch as pulse timing in a data processing system is quite often critical because of the logical operations being performed on sets of signals.

The present invention is concerned with means for attenuating a fluid pulse without the use of expensive moving parts and with available material. Spongy materials are commonly known as having been the subject of much prior art use, particularly in an absorbefacient environment such as filters, etc. The typical sponge medium used in said known filter environment allows the fluid to be transmitted in a constantly changing path through continuously connected and random sized pores or interstices for the purpose of entrapping foreign particles therein. However, in the present invention the size of the sponge pores are important insofar as they are related to the physical length of the fluid pulse to be attenuated. Furthermore, any objectionable amount of reflectivity may be reduced by laminating the sponge structure, while signal propagation delay can be minimized by shaping its enclosing channel so as to have a reduction in flow area at, and particularly downstream from the location of the sponge medium therein.

One object of this invention is to therefore provide a device for attenuating a dynamic fluid pulse which employs a spongy medium completely obstructing the interior confines of a fluid channel and whose pores are chosen to be small relative to the physical length of the fluid pulse to be attenuated.

Another object of the present invention is to provide a fluid pulse attenuating structure incorporating a laminated sponge medium for reducing reflection.

Still another object of the present invention is to provide a fluid pulse attenuating device which includes a spongy medium located in a fluid channel which in turn is shaped with a reduction in its flow area both at and after attenuation is effected.

These and other objects of the present invention will become apparent during the course of the following description to be read in view of the drawings, in which.

Figure 2:
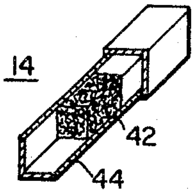
FIG. 2 is a perspective view in section of a first embodiment of the present invention.

Refernce will first be made to FIG. 1 which shows only one typical use to be made of the present invention. Two pure fluid amplifiers 10 and 12 of rectangular cross-section are shown interconnected by a fluid attenuating device 14 of the present invention. Pure fluid amplifier 10 has a power stream input channel 16 which terminates in a nozzle 18 for injecting a relatively large energy power stream fluid jet into an interaction chamber 20. Two power stream output channels 22 and 24 leave chamber 20 at its opposite end, with each said output channel serving to conduct power stream fluid to a different location. Power stream output channel 22 may, for example, be connected to exhaust the power stream back to the intake of the pump or compressor whose output in turn supplies power stream fluid to input channel 16. Power stream output channel 24 may be connected via the attenuating device 14 to one control stream input channel 26 of pure fluid amplifier 12. The particular output channel 22 or 24 taken by the power stream flow in amplifier 10 is determined by the relatively low energy fluid signals applied to its control stream input channels 28 and 30, each of which enters interaction chamber 20 at about a right angle to the flow axis of the power steam as it issues from nozzle 18. Amplifier 10 may be designed either for a momentum exchange or boundary layer operation, whereby a fluid control pulse issuing from either one of the control channels 28 or 30 causes the power stream to be deflected toward a selected power stream output channel. For example, if control stream fluid is applied only to channel 28 of a momentum exchange amplifier, said fluid issues into chamber 20 and strikes the power stream fluid from nozzle 18 so as to direct power stream flow without disrupting its integrity into output channel 22. By suitable design of the amplifier, power stream flow in output channel 22 can be made stable even after said channel 28 control fluid signal is terminated. On the other hand, control stream fluid applied to channel 30 issues into chamber 20 to deflect power stream flow into output channel 24 where it can be made to stay. Power stream flow in channel 24 is used as control stream fluid for channel 26 of amplifier 12 whose operation is identical to the operation of amplifier 10. That is to say, amplifier 12 has a power stream input channel 32, a fluid interaction chamber 34, first and second power stream output channels 36 and 38, and a second control stream input channel 40 on the opposite side of chamber 34 from channel 26. Control fluid issuing from channel 26 into chamber 34 thereupon deflects power stream flow in amplifier 12 so that it passes through output channel 36 to some utilization device not shown. Control fluid applied to channel 40 from some source (not shown) alternatively deflects the power stream of amplifier 12 into its output channel 38.

Figure 1:
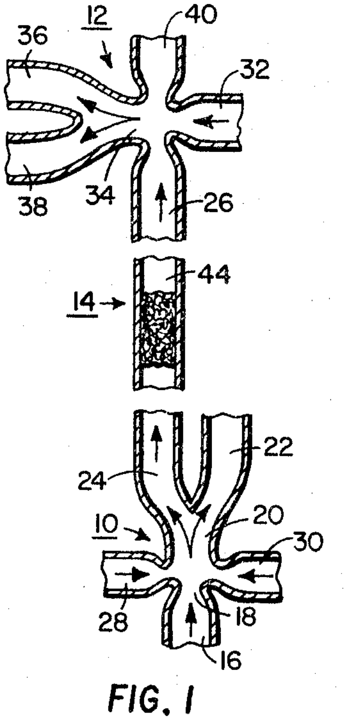
FIG. 1 shows the present invention being used in a system of interconnected pure fluid amplifiers wherein its finds particular although not exclusive, use.

Since operation of a pure fluid amplifier is normally performed using a control stream of lesser energy than the power stream, means very often must be placed in the system interconnection of FIG. 1 to attenuate the energy of the power stream from amplifier 10 when it is applied directly to the control input channel 26 of amplifier 12. This attenuation should be accomplished with little or no propagation delay of the fluid signal above that normally encountered during its traversal of the finite distance between amplifiers 10 and 12, which otherwise might disrupt the critical timing usually required in data processing systems. The manner in which the present invention 14 accomplishes this task is through use of a spongy medium or body 42 placed into a section 44 of the interconnecting fluid conduit. FIGURE 2 best shows how said sponge 42 completely fills the interior of its enclosing channel section. Although it is known in the prior art to provide porous plugs as attenuating material in pure fluid systems, the selection of such prior art plugs has been made from material without regard to either the small physical size of pure fluid systems, and/or the relatively high operating frequency of said systems. That is to say, the present invention for the first time takes into account the size of the sponge pores as related to the physical length of the fluid pulse, as well as other characteristics of spongy material, which are considerations not to be found in the selection of prior art porous plugs.

With respect to the size of the sponge pores relative to the system operating frequency, mass flow velocity, and channel diameter, assume for the purpose of illustration that control signals can be alternately applied to the channels 28 and 30 of amplifier 10 such that power stream flow therein can be switched between power stream output channels 22 and 24 at a frequency of about 10,000 cycles per second. This frequency is typical of the present day pure fluid system capability. Furthermore, if the dwell period of power stream flow is the same in each output channel 22 and 24, this means that during each second of time there are 10,000 pulses of fluid applied to channel 24, with each pulse lasting about 50 microseconds. If the system input and output pressures are adjusted so that the velocity of the fluid mass flow therethrough is subsonic at about 500 feet per second (15,240 cm. per second), then the physical length of each said fluid pulse is about 0.3 inch or 7.6 mm. With these assumptions in mind, the necessary characteristics of the spongy medium 42 may now be described. In order to be effective in attenuating with minimum delay, the pores must be uniform and considerably smaller than the physical length of each fluid pulse which, in the assumed example above, would mean that each sponge pore should be substantially less than 7.6 mm. in diameter. Furthermore, with a typical fluid channel width or diameter of about 3 mm., the sponge pore diameter should also be substantially less than 3 mm. with there further being very little solid side wall spacing between pores, such that the sum of all pore diameters or cross-sectional flow areas at any point in channel section 44 is nearly equal to the channel cross-sectional flow area at said point. In other words, there should be a maximum number of pores in the spongy medium, resulting in a less dense material having a maximum number of interstices.

Other necessary sponge characteristics are the following: flexibility, large strain hysteresis, and coarse surfaces.

A sponge with high hysteresis loss is required because the hysteresis loss is a physical mechanism to convert transient mechanical (fluid) energy into heat energy, thus facilitating increased signal attenuation, and because this "energy consumption" effects the reduction of noise and signals being generated in various phases and modes due to the relaxation of the flexible sponge material subsequent to a strain (and subsequent to an applied transient pressure). Thus, large hysteresis-large deflection and low restoring forces. A sponge with rough surfaces means high friction losses, which is also desirable when attenuation is the objective.

Artificial sponges having the above characteristics and uniform pores of requisite size may be fabricated by any one of a number of well known processes, examples of which may be found in U. S. Patents such as 2,372,669; 2,578,639; and 2,107,637 to name but a few.

Figure 3:
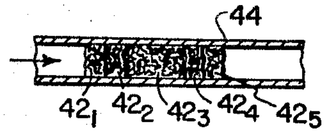
FIG. 3 illustrates a second embodiment of the invention wherein the spongy medium is formed by laminated separate sponge sections.
Figure 4:
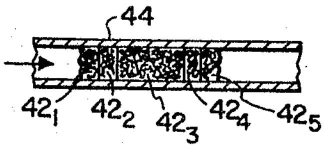
FIG. 4 shows still another embodiment of the invention wherein a single unitary body of spongy material has formed therein a plurality of distinct sections.

Another factor to be taken into consideration is the reflectivity of sponge material. The reflecting characteristic of the sponge with respect to a transient fluid signal depends on the pervious to impervious area ratios, the pore sizes, the material stress/strain relationship, etc. A fluid signal rise (flow rise), for example, which arrives at a discontinuity into an effectively denser medium, will reflect in part as a pressure wave, whereas the same signal arriving at a discontinuity into an effectively less dense medium will be reflected as a higher flow wave. Thus, the reflectivity of a discontinuity in effective material densities is a function of the relative density change encountered by a signal. A transient signal arriving at a sponge surface will, therefore, be partially reflected, which is usually undesirable due to the effects on the previous (upstream) element. Said sponge reflectivity may be abated by laminating the sponge structure in the manner shown in FIG. 3, wherein the sponge body 42 is actually comprised of five separate sponge sections $42_1$, $42_2$, $42_3$, $42_4$, and $42_5$ which are arranged in tandem and in abutting relationship within the conduit section 44. If desired, said separate sponge sections 42 may be laminated or bonded together by a pervious medium in order to form an integral unit. On the other hand, FIG. 4 shows an embodiment wherein a unitary sponge body 42 is made having a plurality of different parts therein which are distinguishable one from the other by a thin line of demarcation. Such a unitary sponge body can be made by the process described in U.S. Patent 2,133,805, among others.

Assuming, for example, that an extremely low density fluid such as air is being employed in the system, it is desirable to have as low as possible a reflectivity at the first (upstream) sponge surface lamination by making $42_1$ just slightly higher in density. The next lamination $42_2$ can have a higher absolute effective density, because only relative effective densities count. Furthermore, any reflected part signal from the second lamination will again be partially reflected forward by the first surface of the first lamination $42_1$. Such multiple reflections also contribute to the eventual attenuation by friction and hysteresis losses. Similarly, in the successive lamination $42_3$ a gradually increasing density may be applied and, if found necessary, further laminations $42_4$ and $42_5$ can be graded again in successively decreasing effective densities to further this desideratum. Particular attenuation requirements will determine the necessary characteristics. However, ideally, successive laminations should increase and gradually decrease again in effective densities. Of course, this effect can also be achieved by means of a sponge material of continuously variable porosity according to the rules established above. Thicknesses of various laminations or the porosity gradient with width (length) will depend on specific requirements, such as signal frequency content, etc. However, as shown in FIGS. 3 and 4 the end laminations $42_1$, $42_2$, and $42_4$, $42_5$ are considerably less thick than is center lamination $42_3$, with the latter being the principal location for attenuation by hysteresis and friction.

Figure 5:
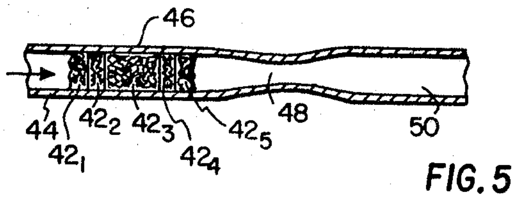
FIG. 5 shows a fourth embodiment of the invention which includes a fluid channel reduced in flow area both at and downstream from the attenuating sponge medium.

Another feature of the present invention is to shape the fluid channel section 44 so as to insure a minimum delay time in signal propagation through the attenuating sponge medium. Such a configuration is shown in FIGURE 5 where it is seen that channel 44 is reduced in cross-sectional flow area, at least in one dimension thereof, both at and downstream from the loctaion of said sponge medium 42. In particular, FIG. 5 shows channel 44 to have a contour such that at least one pair of opposed side walls thereof begins to gradually converge from about a point 46 (which is just downstream from the front or upstream sponge surface 48 upon which the fluid pulse initially impinges) to a point 48 downstream from the sponge medium, so that the point of minimum reduction in channel flow area occurs after the point of attenuation. The said side walls of the channel may then continue parallel for a short distance to maintain the said minimum flow area and then, if desired, gradually diverge to the original input cross-sectional flow area at about point 50. This configuration of fluid channel section 44, particularly the convergence thereof down to the minimum flow area at point 48, facilitates the resumption of full channel flow of the fluid pulse in the event that the impingement thereof upon the sponge medium, and its traversal therethrough, causes partial channel flow. It should here be appreciated that transient signal propagation velocity is, in a system where compression waves having signal content can be generated in the fluid, equal to sonic velocity for full channel flow conditions, but is below sonic velocity for a partial channel flow condition. The particular construction of sponge medium 42 in FIG. 5 is shown to be identical to that in FIG. 4, but it is to be understood that separate physical sections of sponge may be employed (as in FIG. 3) as well as a single sponge body like that shown in FIG. 2.

While several embodiments of the present invention have been shown and/or described, it will be apparent to those skilled in the art that many modifications may be made thereto without departure from the spirit of the invention as defined in the appended claims.

The embodiments of the invention in which an exclusive property or privilege is claimed are defined as follows:

1. A device for attenuating a fluid pulse having a predermined physical flow length in a fluid data handling system, which comprises the combination of:

(a) an elongated fluid channel having an input opening at one end thereof for receiving the fluid pulse, and an output opening at the opposite end thereof for discharging the fluid pulse, with the cross-sectional flow area of said fluid channel throughout its length being such, relative to the cross-sectional flow area of the entering fluid pulse, to insure full channel flow therethrough of the fluid pulse; and (b) a flexible and coarse-surfaced spongy medium of low density and large strain hysteresis which is located within at least a portion of said fluid channel to completely fill the cross-sectional flow area thereof, said medium having substantially uniform pores of a size considerably smaller than both the said flow length of the fluid pulse and the diameter of said fluid channel portion, and of a number such that the sum of all pore cross-sectional flow areas at any point in said fluid channel portion is nearly equal to the fluid channel cross-sectional flow area at said point.

2. The device according to claim 1 wherein the average cross-sectional flow area of said fluid channel is less than 0.1 sq. cm.

3. The device according to claim 1 wherein said fluid channel has a gradual reduction in cross-sectional flow area at some location downstream from that surface of said spony medium upon which the fluid pulse initially impinges during its flow through said fluid channel.

4. The device according to claim 3 wherein said gradual reduction in channel cross-sectional flow area commences somewhere in said channel portion.

5. A device according to claim 4 wherein said gradual reduction in channel cross-sectional flow area is continued downstream from said channel portion.

6. A device for attenuating a fluid pulse having a predetermined physical flow length in a fluid data handling system, which comprises the combination of:

(a) an elongated fluid channel having an input opening at one end thereof for receiving the fluid pulse, and an output opening at the opposite end thereof for discharging the fluid pulse, with the cross-sectional flow area of said fluid channel throughout its length being such, relative to the cross-sectional flow area of the entering fluid pulse, to insure full channel flow therethrough of the fluid pulse; and (b) a flexible and coarse surfaced spongy medium of large strain hysteresis which is located within at least a portion of said fluid channel to completely fill the cross-sectional flow area thereof, said spongy medium having a density which progressively varies along its flow length commencing with an upstream density nearly equal to the density of the system fluid, said spongy medium further having pores of a size considerably smaller than the said flow length of the fluid pulse and the diameter of said fluid channel portion, and of a number such that the sum of all pore cross-sectional flow areas at any point in said fluid channel portion is nearly equal to the fluid channel cross-sectional flow area at said point.

7. A device according to claim 6 wherein the average cross-sectional flow area of said fluid channel is less than 0.1 sq. cm.

8. A device according to claim 6 wherein said spongy medium has a downstream density nearly equal to the density of the system fluid.

9. A device according to claim 6 wherein said fluid channel has a gradual reduction in cross-sectional flow area at some location in said channel portion downstream from that surface of said spongy medium upon which the fluid pulse initially impinges during its flow through said fluid channel.

10. A device according to claim 9 wherein said gradual medium has a downstream density nearly equal to the density of the system fluid.

11. A device according to claim 9 wherein said gradual reduction in channel cross-sectional flow area is continued downstream from said channel portion.

12. A device for attenuating a fluid pulse in a fluid data handling system, which comprises the combination of:

(a) an elongated fluid channel having an input opening at one end thereof for receiving the fluid pulse, and an output opening at the opposite end thereof for discharging the fluid pulse, with the cross-sectional flow area of said fluid channel throughout its length being such, relative to the cross-sectional flow area of the entering fluid pulse, to insure full channel flow therethrough of the fluid pulse; and (b) a flexible and coarse surfaced spongy medium of large strain hysteresis which is located within at least a portion of said fluid channel to completely fill the cross-sectional flow area thereof, said spongy medium having a density which progressively varies along its flow length commencing with an upstream density nearly equal to the density of the system fluid.

13. A device according to claim 12 wherein the average cross-sectional flow area of said fluid channel is less than 0.1 sq. cm.

14. A device according to claim 12 wherein said spongy medium has a downstream density nearly equal to the density of the system fluid.

15. A device according to claim 12 wherein said spongy medium consists of a plurality of distinct sections in serial abutment along the axis of fluid flow through said channel, each said section having a density different from the density of the sections immediately adjacent thereto.

16. A device according to claim 14 wherein said spongy medium consists of a plurality of distinct sections in serial abutment along the axis of fluid flow through said channel, each said section having a density different from the density of the sections immediately adjacent thereto.

17. A device according to claim 15 wherein said plural spongy sections are structurally independent one from the other.

18. A device according to claim 17 wherein said plural spongy sections are laminated together by fluid pervious means.

19. A device according to claim 15 wherein said plural spongy sections are different parts of a single unitary sponge body.

References Cited by the Examiner

UNITED STATES PATENTS 3,223,101 12/1965 Bowles ------------ 137—81.5

OTHER REFERENCES

Gray and Stern: Control Engineering, February 1964, p. 57.

LAVERNE D. GEIGER, *Primary Examiner.*

B. KILE, *Assistant Examiner.*